United States Patent [19]

Steadman

[11] 4,266,530
[45] May 12, 1981

[54] SUN RAY TRACKER

[76] Inventor: Robert W. Steadman, 1601 Sandhill Rd. Sp. 242, Las Vegas, Nev. 89104

[21] Appl. No.: 79,478

[22] Filed: Sep. 27, 1979

[51] Int. Cl.³ ............................ F24J 3/02; F16H 25/12
[52] U.S. Cl. .................................... 126/424; 126/438; 74/56; 350/289
[58] Field of Search ............... 126/424, 425, 438, 437; 350/289, 290; 74/56, 57, 55

[56] References Cited

U.S. PATENT DOCUMENTS

| 3,905,352 | 9/1975 | Jahn | 126/438 |
| 4,111,184 | 9/1978 | Perkins | 126/425 |

Primary Examiner—Albert W. Davis
Assistant Examiner—G. Anderson

[57] ABSTRACT

A solar energy collector, including an assembly of reflectors supported pivotally upstanding upon a circular carriage that rotates once a day upon horizontal, circular tracks, the reflector assembly being adjustable in inclination, so as always to face the sun directly, by means of a brace against its upper end, and the brace lower end traveling in a cam-shaped track having raised and lowered portions, and an electronic programmer activated by the sun light, so as to turn on an electric motor that rotates the carriage.

1 Claim, 7 Drawing Figures

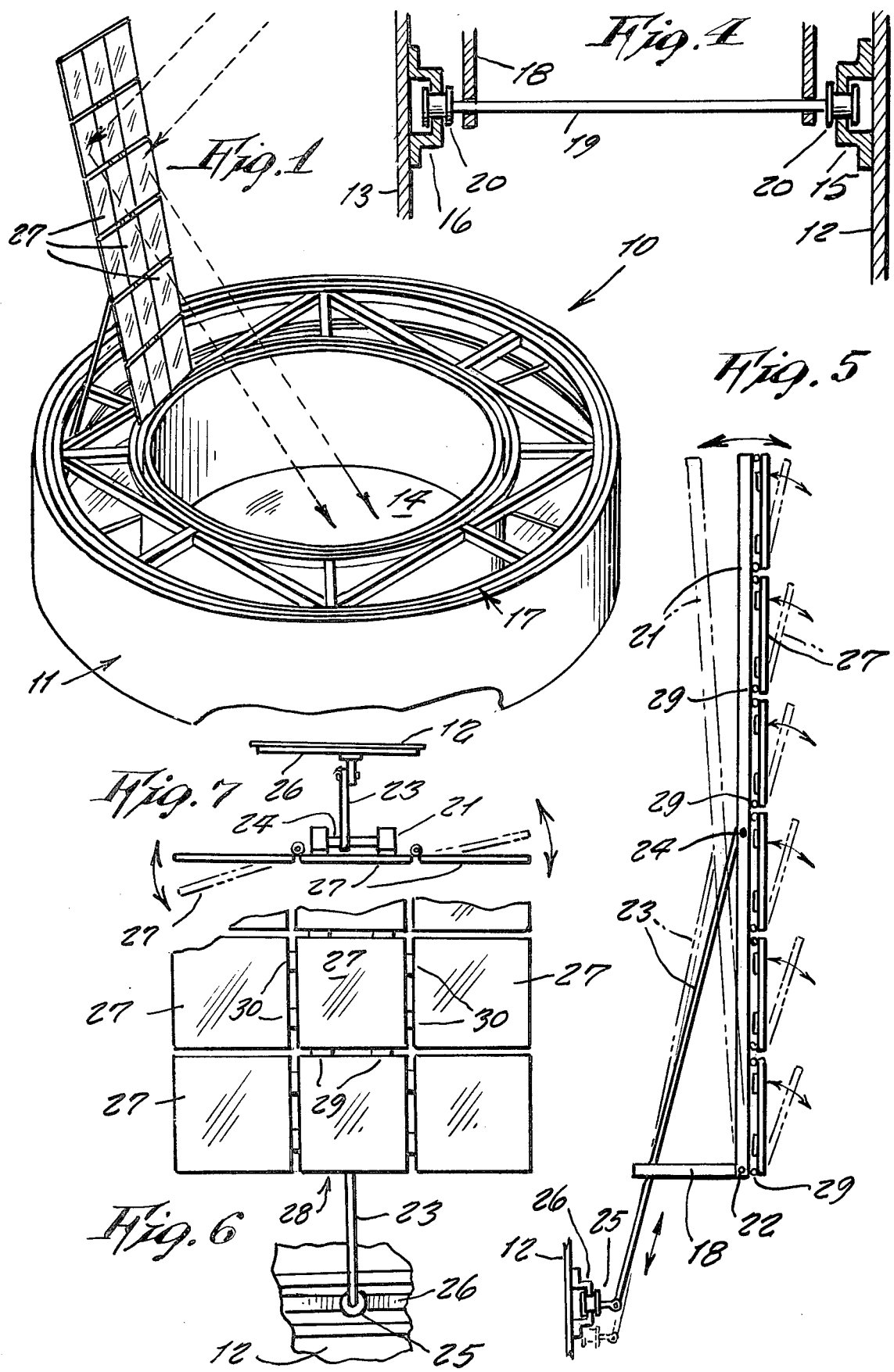

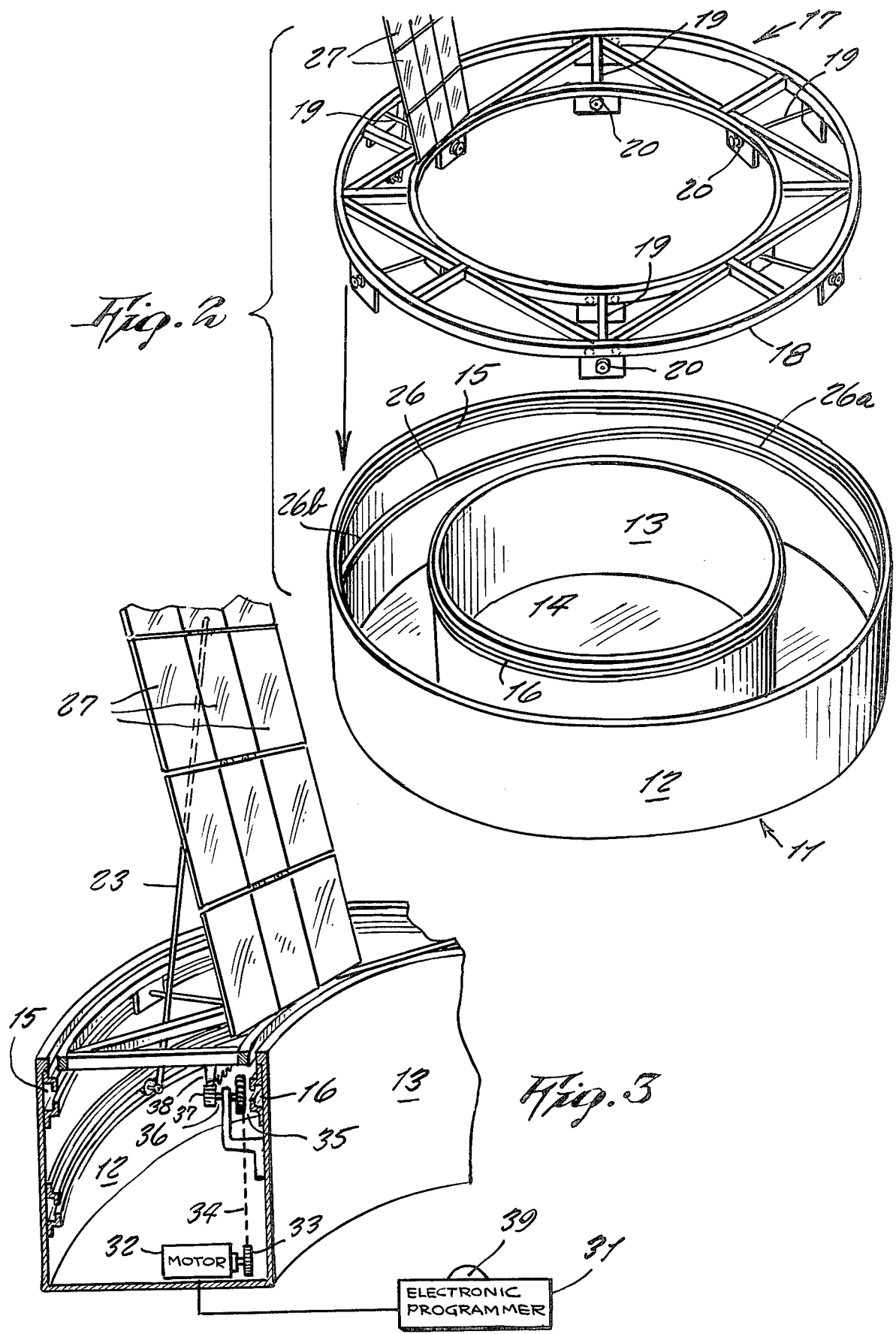

SUN RAY TRACKER

This invention relates generally to solor energy collectors.

While numerous solar energy collectors have been designed heretofore, it will be noted that they generally are of stationary type, such as those mounted upon the roof of a house, and facing the general path of the sun, so as to get a maxium of energy therefrom. However, such stationary collectors, at best, obtain only a fraction of the energy that could be received, if, at all times throughout a day, they would face directly at the sun.

Therefore, it is a principal object of the present invention to provide a sun ray tractor that precisely follows the sun movement across the sky throughout the day, and thus, a larger area of sun rays are always absorbed by the solar energy collector.

Another object is to provide a sun ray tracker, in which the electronic programmer picks up the sun position after the night-time darkness, or after a cloudy period during a day, and accordingly advances the carriage, and sets the reflectors when the sun is again visible, so that maximum efficient operation immediately resumes.

Yet another object is to provide a sun ray tracker, which is designed so that it can be constructed either in small size for private ownership by home owners or which can be made on a very large scale, so as to serve a municipality, such as a town or city.

Other objects are to provide a sun ray tracker, which is simple in design, inexpensive to manufacture, rugged in construction, easy to use and efficient in operation.

These, and other objects, will be readily evident, upon a study of the following specification, and the accompanying drawings, wherein:

FIG. 1 is a perspective view of the invention assembly;

Fig. 2 is a similar view, showing the carriage lifted off the base;

FIG. 3 is an enlarged fragmentary detail of FIG. 1;

FIG. 4 is a detail of the carriage wheel units supported in the tracks of the base;

FIG. 5 is a side view of the reflector assembly;

FIG. 6 is a fragmentary front view thereof, and

FIG. 7 is a top view thereof.

Referring now to the drawings in greater detail, the reference numeral 10 represents a sun ray tracker, according to the present invention, wherein there is a stationary base 11 installed upon the land. The base includes concentric outer and inner, circular wall structures 12 and 13, around a central solar energy collector 14. A circular, horizontal track 15, on the inner side of the outer wall, and a circular, horizontal track 16, on the outer side of the inner wall, support a circular carriage 17 for turning thereupon.

The carriage includes a circular frame 18, having a plurality of radially extending shafts 19, upon each of which a pair of annularly grooved rollers or wheels 20 are mounted, one of the wheels traveling in the inner track 16, and the other wheel traveling in the outer track 15.

Upon the carriage, there is erected an upstanding frame 21, which, at its lower end, is pivotable about a horizotal pivot shaft 22, mounted upon the frame 18. The upper end of the upstanding frame is supported from swinging down, by means of a brace 23, pivotally attached thereto at 24. A lower end of the brace is fitted with an annularly grooved roller or wheel 25, which travels in a cam-shaped track 26, mounted on the inner side of the base outer wall 12, and below the track 15. The cam-shaped track 26 is not horizontal, as the tracks 15 and 16, but extends inclined between raised and lowered portions 26a and 26b, so that, as the brace travels thereupon, it lifts and lowers, so as to cause the upstanding frame to change its upstanding inclined angle, as shown in FIG. 5.

Upon the frame 21, there are carried a plurality of flat reflectors 27. A vertically central row 28 of the reflectors are each pivotally attached at a lower end on a hinge 29, so that the reflector upper end can swing forwardly from the frame 21. At each side of each center reflector, a side reflector is pivotally attached by means of a hinge 30. A frame 21 and reflectors 27 form a reflector assembly. The side reflectors can swing forwardly or rearwardly, as shown in FIG. 7.

An electronic programmer 31, externally located from the base 11, is electrically connected to a motor 32 in the base. The motor has a gear 33 on its output shaft, and an endless chain 34 around the gear, is also passed around a gear 35, affixed on a shaft 36, having also an affixed gear 37 engaging a toothed, circular rack 38 mounted on an underside of the carriage frame 18, as shown in FIG. 3.

The electronic programmer includes a sensitive unit 39, that is activated by sunlight rays; the unit turning on or off the motor 32. Additionally, the sensitive unit can be made to control the pivoted angles of the reflectors, by means of conventional, and well known electrical and mechanical linkages therebetween.

While various changes may be made in the detail construction, it is understood that such changes will be within the spirit and scope of the present invention, as defined by the appended claims.

What I now claim is:

1. A sun ray tracker, comprising in combination: a stationary base, a reflector assembly carried upon said carriage, a solar energy collector at the center of said base, an electronic programmer controlling a motor to turn said carriage, and hinges about which individual reflectors of said reflector assembly can pivot, said base including circular horizontal tracks on which said carriage moves and a circular, axial cam track, said reflector assembly being controllably tilted as said reflector assembly moves with said carriage by a rod linking said reflector assembly to a wheel riding in said axial can track.

* * * * *